(12) United States Patent
Pollard, II et al.

(10) Patent No.: US 7,050,959 B1
(45) Date of Patent: May 23, 2006

(54) DYNAMIC THERMAL MANAGEMENT FOR INTEGRATED CIRCUITS

(75) Inventors: Lloyd L. Pollard, II, Portland, OR (US); Nitin B. Gupte, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,220

(22) Filed: Dec. 23, 1999

(51) Int. Cl.
 *G06F 17/50* (2006.01)
 *G06F 13/10* (2006.01)
 *G05D 11/00* (2006.01)

(52) U.S. Cl. .................. 703/21; 700/293; 713/322; 713/323

(58) Field of Classification Search ................ 703/13, 703/21; 700/293; 713/322–323
See application file for complete search history.

(56) References Cited

U.S. PATENT DOCUMENTS

| 5,365,487 A | 11/1994 | Patel et al. | |
| 5,798,667 A * | 8/1998 | Herbert | 327/573 |
| 5,835,885 A * | 11/1998 | Lin | 702/99 |
| 5,953,685 A | 9/1999 | Bogin et al. | |
| 5,996,084 A * | 11/1999 | Watts | 713/323 |
| 6,173,217 B1 | 1/2001 | Bogin et al. | |
| 6,373,768 B1 | 4/2002 | Woo et al. | |
| 6,393,374 B1 * | 5/2002 | Rankin et al. | 702/137 |
| 6,470,238 B1 | 10/2002 | Nizar et al. | |
| 6,535,798 B1 * | 3/2003 | Bhatia et al. | 700/293 |

FOREIGN PATENT DOCUMENTS

| EP | 0 855 653 A1 | 7/1998 |
| EP | 0 921 458 A2 | 6/1999 |
| WO | PCT/US2004/008893 | 3/2004 |

OTHER PUBLICATIONS

Hafizi et al.: "Reliability of AlIn/As/GaInAs heterojunction bipolars transistors"; IEEE Trans. Elect. Dev.; pp. 2178-2185; 1993.*

* cited by examiner

*Primary Examiner*—Hugh Jones
(74) *Attorney, Agent, or Firm*—Blakely, Sokoloff, Taylor & Zafman LLP

(57) ABSTRACT

The present invention provides for dynamic thermal management of integrated circuits, including memory modules, within a computer system. The thermal management methodology described herein closely couples software operation to hardware operation of the computer system, and allows each system to run at near optimum performance levels without exceeding specified maximum temperature thresholds. In order to achieve such results, the present invention relates physical characteristics of the integrated circuit with physical characteristics of the internal chassis environment, and translates this relationship into a maximum software performance setting. The system monitors and adjusts software performance such that the maximum performance setting is not exceeded.

22 Claims, 3 Drawing Sheets

DYNAMIC THERMAL MANAGEMENT FOR INTEGRATED CIRCUITS

BACKGROUND OF THE INVENTION

1. Field of the Invention

The present invention relates to thermal management. More specifically, the present invention relates to dynamic thermal management of integrated circuits within a computer system.

2. Background Information

The continued trend in integrated circuit (IC) technology is to increase operating frequencies, data transfer rates, and the average number of transistors per IC, while decreasing IC package sizes. Unfortunately, as IC performance levels increase and package sizes decrease, the power density of the ICs increase resulting in higher operating temperatures within each IC. If such operating temperatures are not controlled or managed, the ICs may reach or exceed critical temperature thresholds causing damage and even operational failure to the ICs.

Since system integrators may utilize a variety of ICs within a variety of chassis environments, the resulting thermal characteristics and associated cooling requirements for each system may vary greatly from one assembled system to another. Conventionally, the cooling requirements and associated performance limitations for each system were not determined independently given the specific thermal characteristics of the system. Rather, the cooling requirements and associated performance limitations were determined based upon a least optimal thermal environment (or "lowest common denominator" system). Accordingly, ICs located within thermally efficient environments that were capable of operating at higher frequencies without overheating, were penalized by having performance limits set artificially low based upon less thermally efficient system environments. By artificially setting performance limits low, valuable bandwidth and/or processing power is wasted.

SUMMARY OF THE INVENTION

A thermal management method is disclosed. The method includes determining a maximum sustainable power level for an integrated circuit based upon characteristic data, translating the maximum sustainable power level into a maximum performance characteristic, and adjusting operation of the integrated circuit such that the maximum performance characteristic is not exceeded.

BRIEF DESCRIPTION OF THE DRAWINGS

The present invention will be more fully understood from the detailed description given below and from the accompanying drawings of various embodiments of the invention, which, however, should not be taken to limit the invention to the specific embodiments, but are for explanation and understanding only.

DETAILED DESCRIPTION

The present invention provides for dynamic thermal management of integrated circuits, including memory modules, within a computer system. The thermal management methodology described herein closely couples software operation to hardware operation of the computer system, and allows each system to run at near optimum performance levels without exceeding specified temperature thresholds. In order to achieve such results, the present invention relates physical characteristics of the integrated circuit with physical characteristics of the internal chassis environment, and translates this relationship into a maximum software performance setting. The system is then able to monitor and adjust software performance such that the determined maximum performance setting is not exceeded.

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art. Additionally, parts of the description will also be presented in terms of operations performed through the execution of programming instructions, using terms such as determining, selecting, processing and so on. As well understood by those skilled in the art, these operations are often accomplished through storing, transferring, combining, or otherwise manipulating electrical, magnetic, and/or optical signals.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment.

Figure 1:
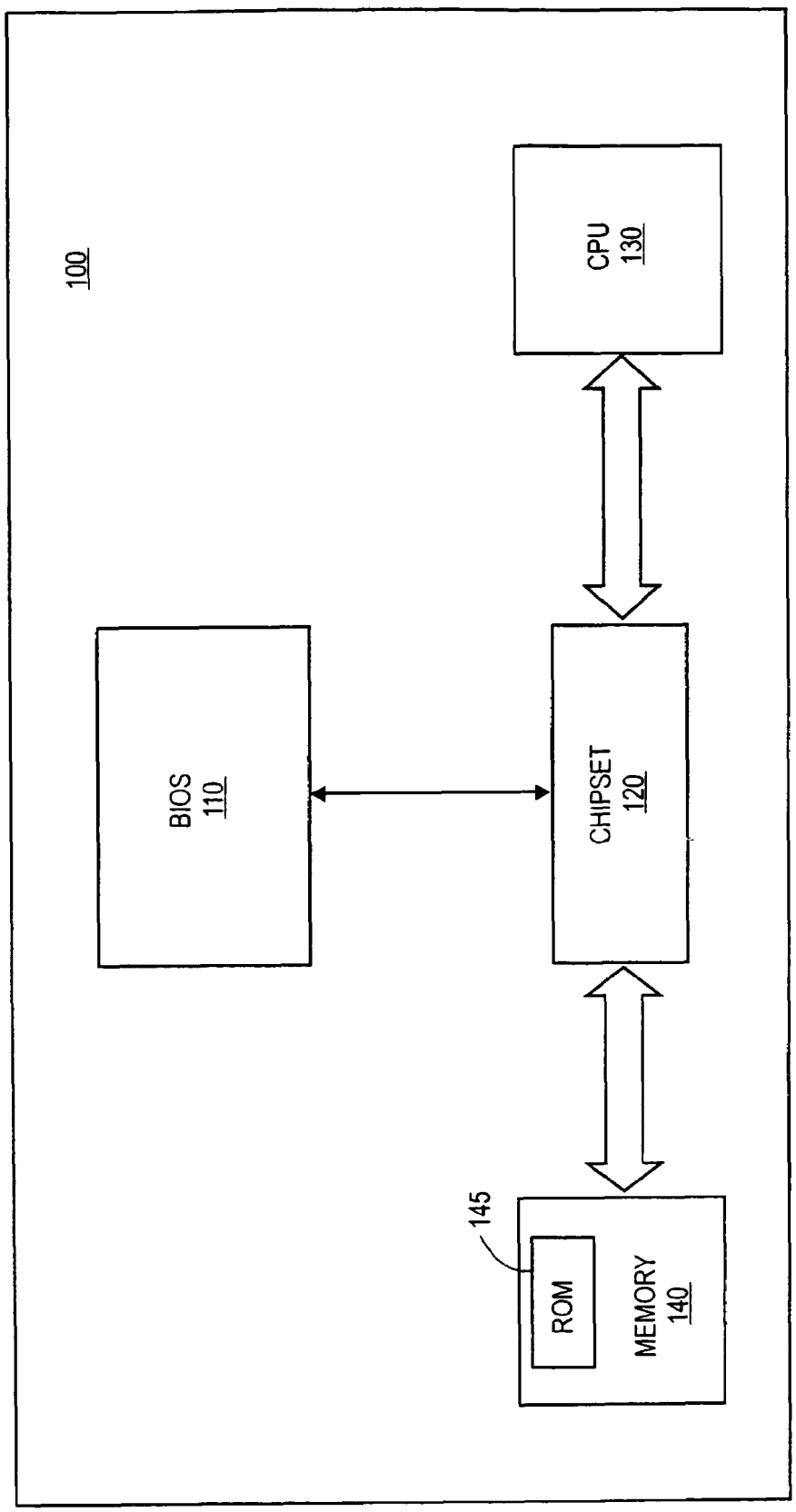
FIG. 1 is a block diagram illustrating one embodiment of an arrangement for providing dynamic thermal management of an IC.

FIG. 1 is a block diagram illustrating one embodiment of an arrangement for providing dynamic thermal management of an IC. System 100 is shown including BIOS 110, central processing unit (CPU) 130, and memory module 140, all of which are coupled together via chipset 120. Although in one embodiment, system 100 represents a general purpose computer system, the invention described herein should not be read as being limited for use solely within a general purpose computer system.

Chipset 120 represents one or more general and/or special purpose data control devices known in the art to route data and optimize performance between various functional components of system 100.

CPU 130 represents a general purpose microprocessor known in the art to process data. In one embodiment, CPU 130 is a processor from the PENTIUM® (e.g., PENTIUM®, PENTIUM® II, PENTIUM® III) family of processors available from Intel Corporation of Santa Clara, Calif. It will be apparent to one skilled in the art, however, that a variety of other general and/or special purpose processors could also be used.

BIOS 110 represents a nonvolatile memory device, such as for example, an electrically erasable programmable read only memory (EEPROM) or a flash memory, having a basic input/output system stored therein. In one embodiment, BIOS 110 includes a variety of system environment characteristics, including for example, thermal characteristics. In one embodiment, the thermal characteristics are set in BIOS 110 by a system integrator for example, to reflect the specific thermal environment of a given system as determined, at least in part, by the configuration of the system. Such thermal characteristics can include, but are not limited to the local airspeed within a system chassis, the ambient air temperature within the chassis, the spacing of integrated circuits such as memory modules and processors within the chassis, and so forth. Although such environmental characteristics may be manually set within BIOS 110, various automated mechanisms including airspeed sensors and temperature sensors may instead be used to automatically provide at least a portion of such environmental characteristic data to BIOS 110.

Memory module 140 represents any of variety of volatile data storage devices known in the art to temporarily store data. Such data storage devices can include random access memory (RAM), dynamic random access memory (DRAM), synchronous dynamic random access memory (SDRAM), and the like. In one embodiment, memory module 140 is an RDRAM® memory module available from Rambus Inc., of Mountain View, Calif. In one embodiment, memory module 140 further includes ROM 145 which represents a nonvolatile data storage device, such as an EEPROM or flash memory, to store module design characteristic data specific to memory module 140. Such module design characteristic data can indicate the associated memory module type, module organization, module timing parameters, and the like. In one embodiment of the present invention, ROM 145 is a serial presence detect (SPD) device that stores memory module design characteristics including the number of devices on the module, active, idle, and standby power consumption levels of each device on the module, substrate height, heat spreader design data, a maximum allowable junction temperature, and so forth.

BIOS 110 utilizes a combination of thermal environment characteristics and memory module design characteristics to determine a maximum sustainable power level for an integrated circuit, such as memory module 140. For the purposes of this disclosure, "maximum sustainable power level" is defined as an amount of operational power that an integrated circuit can dissipate given a particular thermal environment so as to not exceed specified minimum and/or maximum temperature thresholds. In embodiments where the integrated circuit is an RDRAM® memory module, a maximum sustainable power level for the module may be determined according to the following equation 1:

$$Px = \frac{[(Tj - Ta) - (B \times Pact\_i + C \times Pstdby + D \times Pnap)]}{A} \quad (EQ.1)$$

Unlike most other memory modules, RDRAM® memory modules comprise multiple discrete memory devices that are individually addressable by a host system. Due to this distinction, only a select one of the various memory devices will be active at any given time. The remainder of the memory devices that are not in an active state assume a variety of power management modes, including a standby mode and a nap mode, as determined by a given power distribution model for the module ("pooling policy"). In one embodiment, the pooling policy is fixed, whereas in other embodiments, the pooling policy can be dynamically determined by BIOS 110 (using equation 1 for example) so as to maximize bandwidth given a maximum sustainable active device power.

Referring to Equation 1, (Px) represents the maximum sustainable power level which is to be determined for the given integrated circuit (e.g. memory module 140), Tj represents the junction temperature of the specific memory module, Ta represents the ambient temperature within a system (e.g. system 100) chassis, Pact_i represents the power level for the active idle device, Pstdby represents the power level(s) for one or more devices in standby mode, and Pnap represents the power level(s) for one or more devices in nap mode.

Multipliers A, B, C and D represent influence coefficients specific to the given system being analyzed. The influence coefficients may be determined using principles known in the art based upon various environmental characteristics of the system including airflow rates, specific module layout, and integrated circuit packaging, as well as chassis layout, and motherboard layout. In one embodiment, the influence coefficients are stored in BIOS 110 and are referenced by the BIOS for use in determining the sustainable power level for an associated integrated circuit. In one embodiment, BIOS 110 includes influence coefficients for a variety of possible system platform in addition to the system platform within which BIOS 110 is located. In such an embodiment, BIOS 110 can, for example, access the proper influence coefficients through the use of a lookup table.

Once BIOS 110 determines the maximum sustainable power level for the integrated circuit, it translates this power level into a maximum performance characteristic. In one embodiment, the maximum performance characteristic represents an average allowable sustained data transfer rate or "bandwidth" such that during normal operation, the integrated circuit (or memory module) does not exceed specified temperature thresholds. Given the maximum sustainable power level (Px), the average allowable bandwidth (BW) may be calculated based upon the following equation 2:

$$BW = \frac{[Px \times Peak\_bandwidth]}{Max\_Device\_power} \quad (EQ.2)$$

Referring to equation 2, Peak_bandwidth represents a fixed value that refers to the maximum threshold bandwidth that the specific integrated circuit technology is capable of handling. Such information is readily available and can be programmed within a ROM for automatic retrieval by BIOS 110. For example, an RDRAM® memory module and/or memory subsystem has a known maximum bandwidth of 1.6 Gigabytes per second (Gb/s) which can be utilized by BIOS 110 to determine BW for a given RDRAM® module. The Max_Device_power is a value, provided by the manufacturer of the integrated circuit, that specifies the maximum amount of power a given active device can dissipate. In an embodiment where the integrated circuit is an RDRAM® memory module, Max_Device_power refers to the maximum power the single active device can dissipate at peak bandwidth without being damaged. In one embodiment, the values representing both Peak_bandwidth and Max_Device_power are stored in a ROM that is accessible to BIOS 110. In an embodiment where the integrated circuit is a memory module, the Peak_bandwidth and Max_Device_power are stored in a ROM, such as ROM 145, located on the memory module.

Once the maximum performance characteristic (e.g. bandwidth) of the integrated circuit is determined, the system adjusts operation of the integrated circuit so as to keep operating temperatures within a specified range. In one embodiment, BIOS 110 adjusts operation of memory module 140 to maintain operating temperatures within a specified range, whereas in an alternative embodiment, chipset 120 may adjust the operation of memory module 140 to maintain such a temperature range. In an embodiment where the maximum performance characteristic represents the allowable sustained data transfer rate through memory module 140, BIOS 110 monitors the total number of reads and writes experienced by memory module 140. As long as the total number of memory reads/writes does not exceed a threshold amount within a specified time frame, operation of memory module 140 is not affected. If, however, the total number of memory reads/writes does exceed a threshold amount within a specified time frame, then BIOS 110 attempts to decrease performance of memory module 140. In one embodiment, BIOS 110 decreases performance of memory module 140 by suspending further reads/writes from/to memory module 140 for a period of time. It will be apparent to one skilled in the art, however, that other such methods may be implemented to decrease performance.

Figure 2:
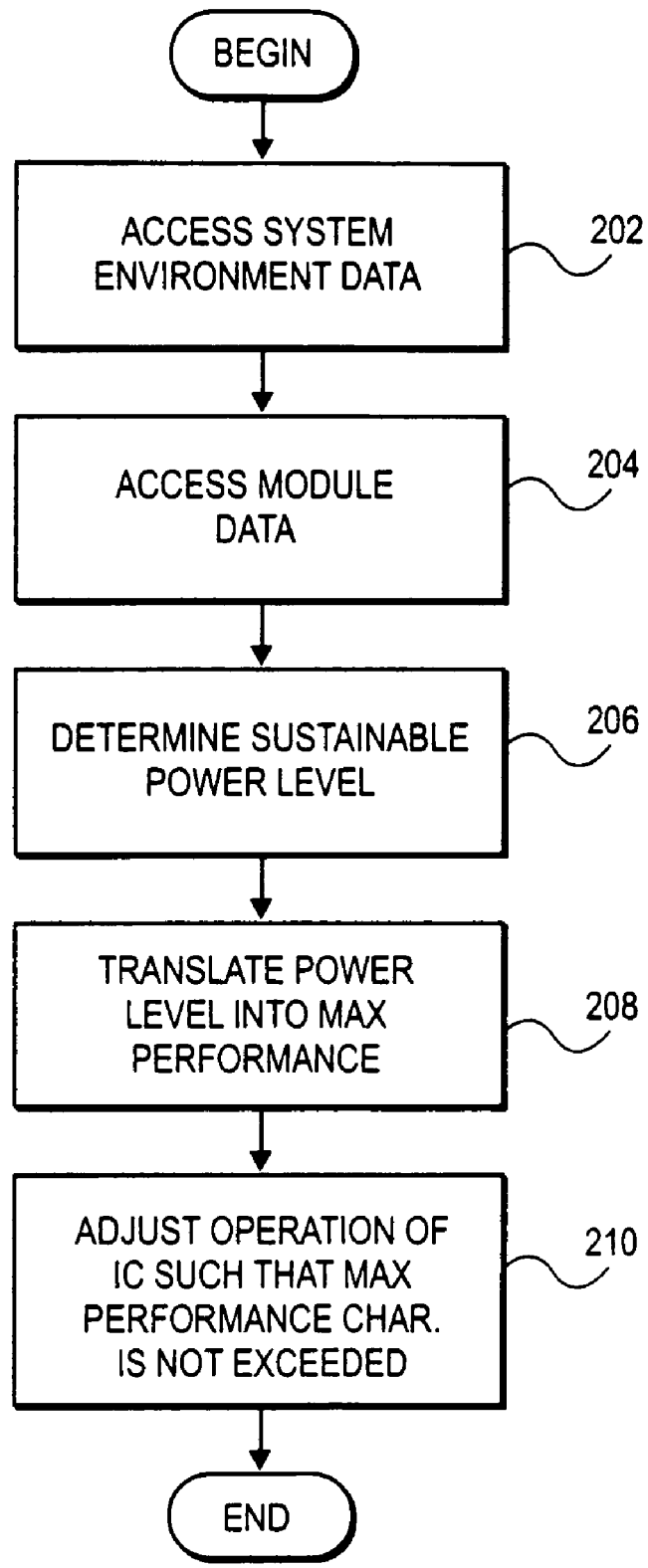
FIG. 2 is a flow diagram illustrating the operation of a Basic Input/Output System as it relates to one embodiment of the present invention.

FIG. 2 is a flow diagram illustrating one embodiment of the operation of a dynamic thermal management system. In accordance with one embodiment of the present invention, BIOS 110 accesses characteristic data representing the specific thermal environment of the computer system within which BIOS 110 is located (202). In one embodiment, the characteristic data is stored within BIOS 110, whereas in other embodiments, the characteristic data may be stored within a memory device other than BIOS 110. BIOS 110 additionally accesses module design characteristics indicating the specific design implementation of memory module 140 (204). In one embodiment, the module design characteristics are stored within ROM 145 of memory module 140.

Given specific thermal system environment characteristics (including airspeed and air temperature), module design characteristics (including the number of devices on the memory module), and a usage model (including the number of active devices, active idle devices, and standby devices on the memory module, as well as the power dissipated by each device), BIOS 110 determines the maximum sustainable power that the single active device can dissipate without exceeding a specified temperature range (206).

Once BIOS 110 determines the maximum sustainable active device power, it translates this value into a maximum performance characteristic (208). In one embodiment, the maximum performance characteristic represents a maximum allowable sustained data transfer rate for memory module 140. Once the maximum performance characteristic is determined, BIOS 110 adjusts operation of the memory module accordingly such that the determined maximum performance characteristic is not exceeded (210).

In the above description, the maximum performance characteristic of an active device was described in terms of the average allowable bandwidth (BW) and the maximum sustainable power level (Px) for the device. The length of time for which the device may transfer data at a predetermined maximum rate ("burst rate", wherein burst rate=peak bandwidth) may also be obtained given the maximum sustainable power level (Px) for the device.

Typically, a change in power input into an IC results in a corresponding change in temperature of the IC. Thus, if power input into an integrated circuit is controlled, the temperature of the IC may be estimated based on the known response characteristics. In an IC, temperature changes in response to corresponding input power changes are driven by the thermal time constant of each integrated circuit package. Such thermal time constants may readily be ascertained according to methods known in the art. Given the specific thermal time constant of an IC, the initial power state of the IC, the maximum sustainable power level (Px) for the IC, and an initial ambient temperature, the length of time for which the integrated circuit can operate at its burst rate/peak bandwidth may be determined such that the IC temperature is maintained within some threshold range.

Figure 3:
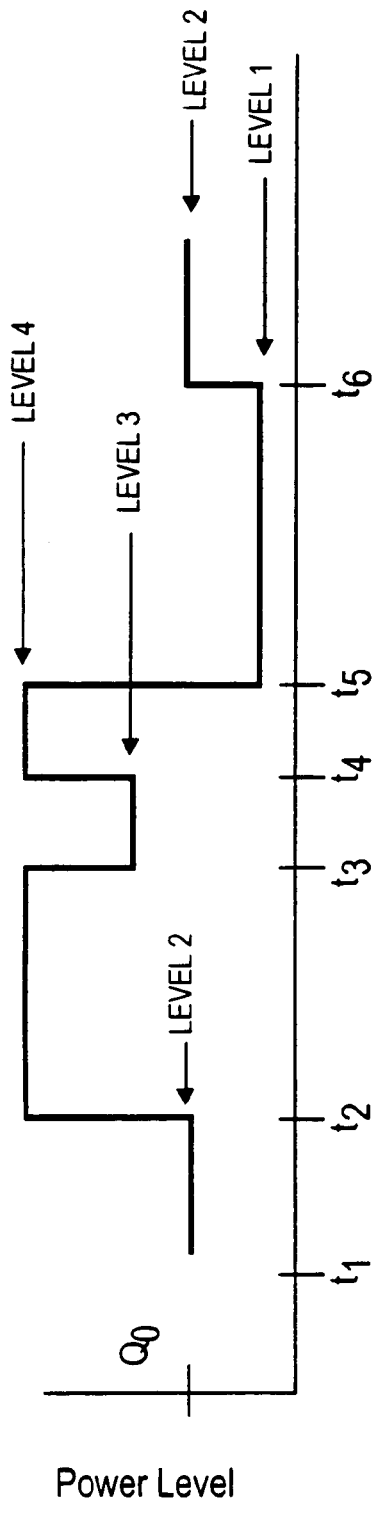
FIG. 3 is a graph illustrating the relationship between a given power input and a corresponding temperature output of an IC.
Figure 3:
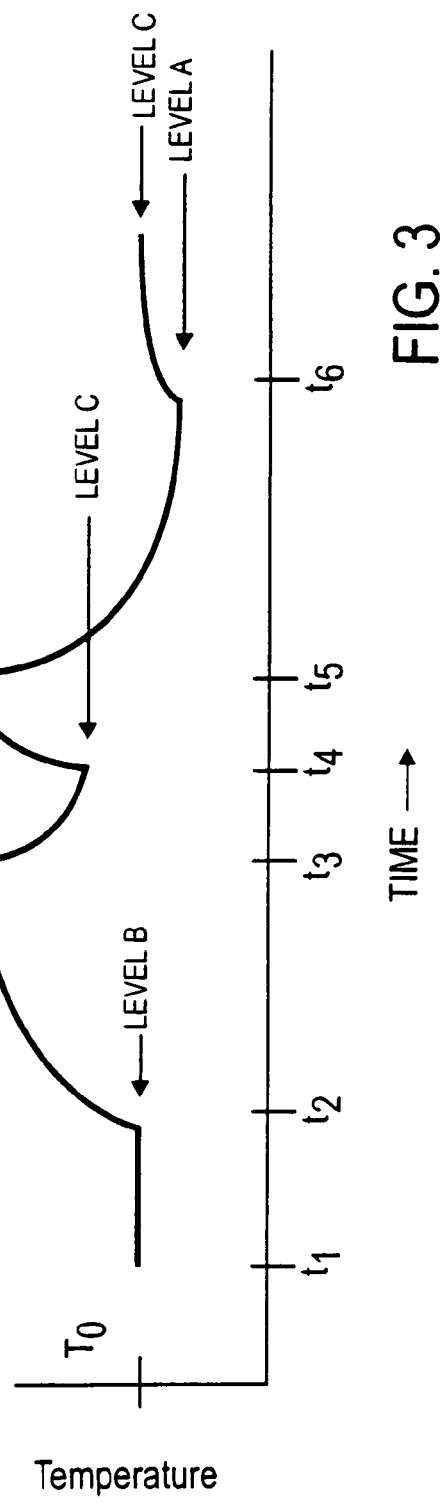

FIG. 3 is a graph illustrating the relationship between a given power input and a corresponding temperature output of an IC. At time t1, the IC exists in an initial power state (level 2). As long as this initial power state is maintained, the corresponding temperature of the IC remains unchanged. When the power input of the IC is increased at time t2 (from level 2 to level 4 for example), the temperature of the IC asymptotically increases towards a temperature indicated by level D. At time t3, the power input is decreased to yet another level (level 3). As the power input is decreased at t3, the IC temperature asymptotically decreases to a corresponding temperature level C. At time t5, the power input is decreased to a power level (level 1) that is less than the initial power level of the IC. In such a case, the temperature also decreases (asymptotically) to a level (level A) that is less than the initial temperature.

Although in the above description, operation of the present invention has primarily been described with respect to memory modules, the present invention is equally applicable to a variety of integrated circuits including for example, CPU 130. Rather than utilizing memory module design characteristics, BIOS 110 may equivalently utilize processor design characteristics stored within CPU 130 or some identified data storage device.

Thus, a system for dynamic thermal management of integrated circuits has been described. In the above description, a value representing the maximum sustainable power level for an active device within a system was determined. That power level value was then utilized to determine a maximum operational bandwidth for the device such that under normal conditions, the device would not exceed established operational temperature thresholds. Additionally, the maximum sustainable power level for a device was utilized to determine a length of time for which the device can operate at a maximum transfer rate ("burst rate") such that the device would not exceed established operational temperature thresholds.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. A method comprising:
    determining a sustainable power level for an integrated circuit based upon environmental system thermal characteristics and design characteristics of the integrated circuit;
    calculating a maximum allowable data transfer rate based on the sustainable power level; and
    adjusting operation of the integrated circuit such that the maximum allowable data transfer rate is not exceeded.

2. The method of claim 1, wherein the environmental system characteristics are stored within the BIOS.

3. The method of claim 1, wherein the design characteristics are stored within the integrated circuit.

4. The method of claim 1, wherein the integrated circuit comprises a memory module.

5. The method of claim 4, wherein the memory module comprises a RDRAM memory module.

6. The method of claim 1, wherein adjusting operation of the integrated circuit further comprises:
monitoring an amount of data transferred to and/or from the integrated circuit; and
reducing the amount of data transferred if the amount of data transferred results in a data transfer rate that exceeds the maximum allowable data transfer rate.

7. The method of claim 1, wherein adjusting operation of the integrated circuit further comprises determining an amount of time for which the maximum allowable data transfer rate can be sustained.

8. The method of claim 1, wherein said determining is performed by a BIOS.

9. The method of claim 1, wherein the design characteristics are stored on a serial presence detect (SPD) device.

10. The method of claim 9, wherein the SPD is on the integrated circuit.

11. A apparatus comprising:
a unit to determine a maximum sustainable power level for an integrated circuit based upon environmental system thermal characteristics and design characteristics of the integrated circuit, wherein the maximum sustainable power level includes an amount of power that the integrated circuit can dissipate without exceeding temperature thresholds of components of the integrated circuit;
a unit to translate the maximum sustainable power level into a maximum allowable data transfer rate; and
a unit to adjust operation of the integrated circuit such that the maximum allowable data transfer rate is not exceeded.

12. The apparatus of claim 11, wherein design characteristics stored within the integrated circuit.

13. The apparatus of claim 11, wherein the environmental system characteristics further include active, idle, and standby power consumption levels stored within the integrated circuit.

14. The apparatus of claim 11, wherein the integrated circuit comprises a memory module.

15. A system comprising:
a RDRAM memory module;
a unit to determine a maximum sustainable power level for the integrated circuit based upon environmental system thermal characteristics and design characteristics of the integrated circuit, wherein the maximum sustainable power level includes an amount of power that the integrated circuit can dissipate without exceeding temperature thresholds of components of the integrated circuit;
a unit to translate the maximum sustainable power level into a maximum allowable data transfer rate; and
a unit to adjust operation of the integrated circuit such that the maximum allowable data transfer rate is not exceeded.

16. The system of claim 15, wherein the integrated circuit comprises a memory module having at least a portion of the environmental system characteristics stored thereon.

17. The system of claim 15, wherein the environmental system characteristics further include active, idle, and standby power consumption levels stored within the integrated circuit.

18. The system of claim 15, wherein the maximum allowable data transfer rate represents a maximum performance characteristic.

19. An article of manufacture comprising a machine readable medium having a plurality of machine readable instructions stored thereon, wherein the instructions, when executed by a processor, cause the processor to:
determine a maximum sustainable power level for an integrated circuit based upon environmental system thermal characteristics and design characteristics of the integrated circuit, wherein the maximum sustainable power level includes an amount of power that the integrated circuit can dissipate without exceeding temperature thresholds of components of the integrated circuit;
translate the sustainable power level into a maximum allowable data transfer rate; and
adjust operation of the integrated circuit such that the maximum allowable data transfer rate is not exceeded.

20. The article of manufacture of claim 19, further comprising instructions that, when executed by a processor, cause the processor to adjust operation of the integrated circuit by determining an amount of time for which the maximum allowable data transfer rate may be sustained.

21. A system comprising:
a RDRAM memory module; and
a machine readable medium having a plurality of machine readable instructions stored thereon, wherein the instructions, when executed by a processor, cause the processor to:
determine a maximum sustainable power level for an integrated circuit based upon environmental system thermal characteristics and design characteristics of the integrated circuit, wherein the maximum sustainable power level includes an amount of power that the integrated circuit can dissipate without exceeding temperature thresholds of components of the integrated circuit;
translate the maximum sustainable power level into a maximum allowable data transfer rate; and
adjust operation of the integrated circuit such that the maximum allowable data transfer rate is not exceeded.

22. An apparatus comprising:
means for determining a maximum sustainable power level for an integrated circuit based upon environmental system thermal characteristics and design characteristics of the integrated circuit, wherein the maximum sustainable power level includes an amount of power that the integrated circuit can dissipate without exceeding temperature thresholds of components of the integrated circuit;
means for translating the maximum sustainable power level into a maximum allowable data transfer rate; and
means for adjusting operation of the integrated circuit such that the maximum allowable data transfer rate is not exceeded.

* * * * *